May 19, 1970 M. BASTIAN ETAL 3,513,263

PRIVATE BRANCH TELEPHONE SWITCHING SYSTEM

Filed Oct. 31, 1967 6 Sheets-Sheet 3

United States Patent Office
3,513,263
Patented May 19, 1970

3,513,263
PRIVATE BRANCH TELEPHONE SWITCHING SYSTEM

Michel Bastian, St. Jeannet, Pe Psi Chu, Bernard Corby, Andre James, and Robert Le Blanc, Vence, and Andrzej Milewski, Lagaude, France, assignors to International Business Machines Corporation, Armonk, N.Y., a corporation of New York Filed Oct. 31, 1967, Ser. No. 679,375
Claims priority, application France, Nov. 4, 1966, 8,128
Int. Cl. H04m 3/42
U.S. Cl. 179—27 1 Claim

ABSTRACT OF THE DISCLOSURE

A Private Branch Telephone Exchange (PBX) controlled by a Central Processing Unit (CPU) and comprising voice circuits, control circuits, and a number of operator consoles. The voice circuits are switching matrices to internal and external phones and are controllable to enable selected interconnections. An auxiliary network enables the CPU to connect service units for dial tone, ringing, conference call, etc. to the phones.

The CPU is connected to each of the voice circuits by sensing lines and by circuit control lines to enable detection of a circuit condition change and the making of a response thereto. The operator consoles comprise some control keys and indicator lights and are controlled by the CPU as if they were special inputs.

OBJECTS OF THE INVENTION

The present invention relates to a centrally controlled telephone switching system and concerns more particularly, an entirely electronic private branch exchange (PBX) installation.

One of the objects of the invention is to provide new arrangements to increase the flexibility of private telephone switching systems, in order to meet various new requirements and to facilitate the connection of additional elements, or circuits, performing the functions corresponding to these needs.

Another object of the invention is to permit an easy and rational exploitation of utilization circuits as well as an increase in data processing speed and, consequently, in traffic handling ability.

Another object of the invention is to provide a private branch exchange system in which a central control unit picks up all useful data from the utility and supervision circuits, processes and said data and controls the interconnections of said circuits.

Another object of the invention is to provide increased centralization of the various circuits used in a switching system, such as the operators' circuits, the tone sending circuits, and all the circuits corresponding to the particular services offered by the system.

Another object of the invention is to provide a switching system in which the centraliaztion of service circuits is obtained by means of a particular switching network, called a service network, which enables linking between the main network and the said service circuits.

Another object of the invention is to provide a switching system comprising:

On one hand, the main network, subdivided into an external communication network, an internal communication network, and a certain number of couplers used to set up these communications and, On the other hand, a service network permitting each service circuit to be selectively connected to one side or the other of the couplers, or directly to the network for internal communications, these direct connections permitting a better coupler utilization.

Another object of the invention is to permit an extension of the number of service circuits, according to traffic requirements, as well as to allow for the creation and the coupling of services answering to new needs.

Another object of the invention is to provide a switching system which can be adapted to either direct-current dialing or frequency combination dialing techniques.

Another object of the invention is to provide a telephone switching system which can particularly lend itself to standardization of the various basic elements, and to a modular design of the network and, thereby, enable easier and cheaper maintenance.

Another object of the invention is to provide a simple and functional operator console signaling and handling system, thereby making the operators' task easier and reducing their working time per call.

As an example, in the preferred embodiment of the invention, to be described in detail later, consider a switching system belonging to a private branch exchange (PBX) which comprises a group of control circuits, and a separate group of voice and supervision circuits.

This last group essentially comprises the switching devices proper and is composed of a main and an auxiliary switching network. The main switching network comprises two switch networks, "internal" and "external," which connect to all the internal and external lines respectively, permitting communications between the PBX and the connected public exchanges. Each of these two networks comprise a number of switching matrix stages. Connections between the calling and the called subscribers, as well as between the matrix switch-points, is effected by means of couplers. Certain of these couplers connect some of the internal network outputs to the external network inputs for communication between an internal and an external subscriber while others connect two internal network outputs together for communication between two internal subscribers. The auxiliary switching network is a concentration network made up of several matrix stages and is called a service network. Its outputs are connected to all the PBX services, especially to the operators' sets and to the various tone generators. The network inputs are connected, according to their purpose and their functions, either in pairs on opposite sides of each coupler, or directly to certain internal switching network outputs, thus permitting a more efficient utilization of the couplers or, finally, two-by-two to permit certain services to communicate with one another.

The control and supervision circuits pick up, through their test and the scanning circuits, data on the conditions of the voice circuits. This data is processed in a central processing unit which can control the status changes of various voice and supervision circuits according to the data processing result.

The foregoing and other objects, features and advantages of the invention will be apparent from the following more particular description of a preferred embodiment of the invention, as illustrated in the accompanying drawings.

DETAILED DESCRIPTION OF A PREFERRED EMBODIMENTS

Figure 1:
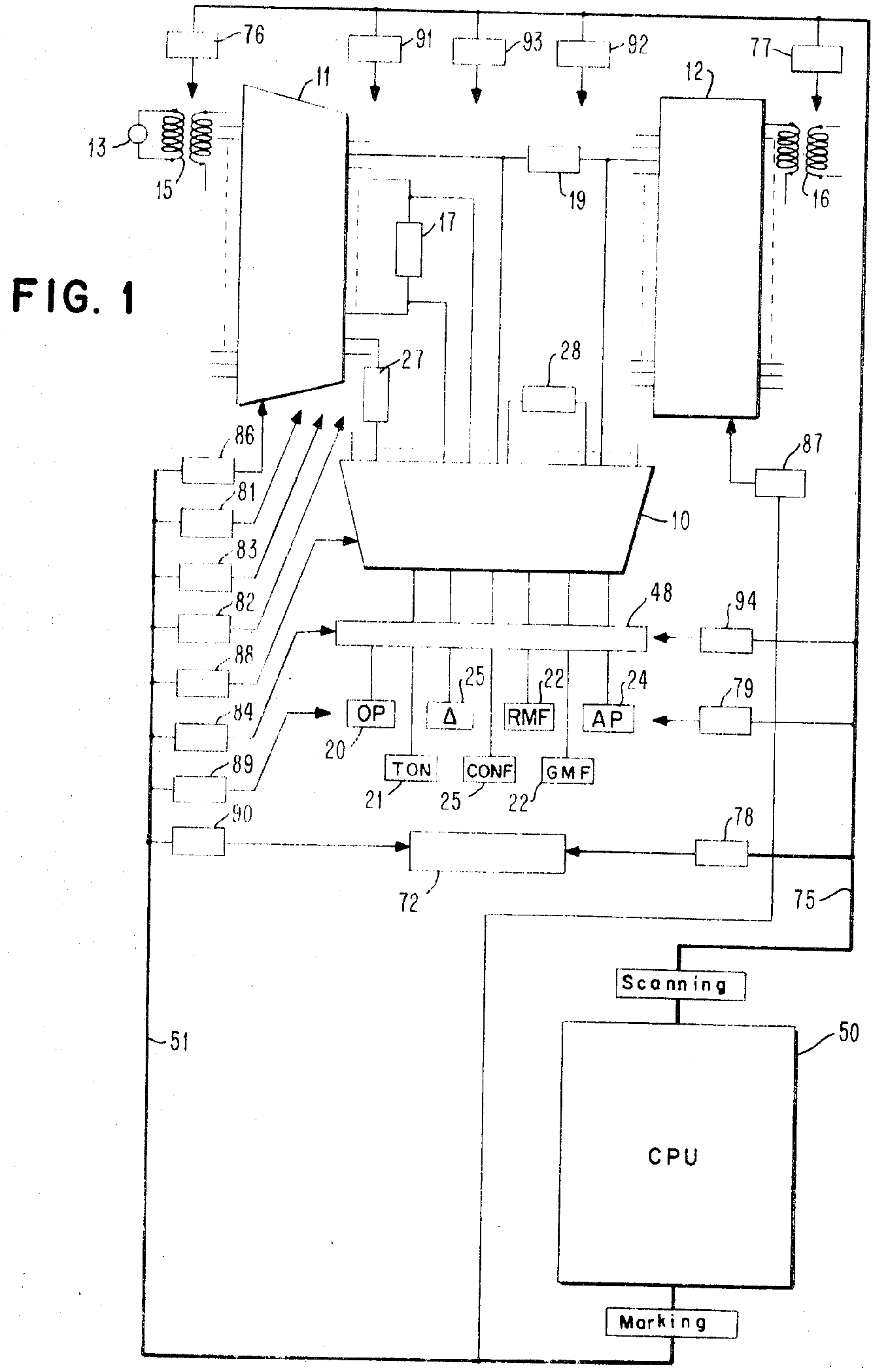
FIG. 1 is a schematic representation of a switching system according to the invention, and shows the voice and control circuits.

FIG. 1 is a diagrammatic representation of the general layout of a switching system which, as described, is a part of a private telephone exchange. This system is essentially a group of voice circuits, a group of control circuits and a number of operator consoles which are linked to both the voice and the control circuits.

VOICE CIRCUITS DESCRIPTION

The voice circuits comprise a main switching network and an auxiliary switching network which will, hereafter, be called the service network 10.

These networks are made up of matrices comprising electronic cross-point connectors such as PNPN thyratrons.

The main network comprises an internal network 11, an external network 12, and connecting elements called couplers. The purpose of these couplers is, on one hand, to power the matrix cross-points and, on the other hand, to interconnect the various voice circuits.

The inputs 13 of network 11 (left hand portion of the figure) are connected to the internal subscriber loop transformers 15. The outputs of network 12 (right hand portion of the figure) are connected to the external junction line transformers 16. Communications between internal extensions are effected through network 11 by energization of couplers such as 17 which connect pairs of the internal network outputs.

Communications between internal subscribers and subscribers outside the PBX, are effected by means of the internal network 11, the external network 12, and by some couplers 19 which connect certain outputs of network 11 to the inputs of network 12.

Service network 10 is used to connect the internal extensions, or the external lines, to various PBX services which are, principally, the operator sets 20, the tone generators 21, the multi-frequency transmitter-receivers 22, the vocal announcement emitters 24 and the conference circuits 25.

These connections are effected in the following manner: each side of a coupler (internal or external) 17 or 19 is connected to one input of network 10: certain inputs of network 11 are connected to network 10 by means of some intermediate couplers 27 and, finally, certain elements called inter-service links 28 connect two-by-two, certain inputs of network 10. These lines 28 permit an eventual connection between two service sets, in particular between two operator sets.

Figure 2:
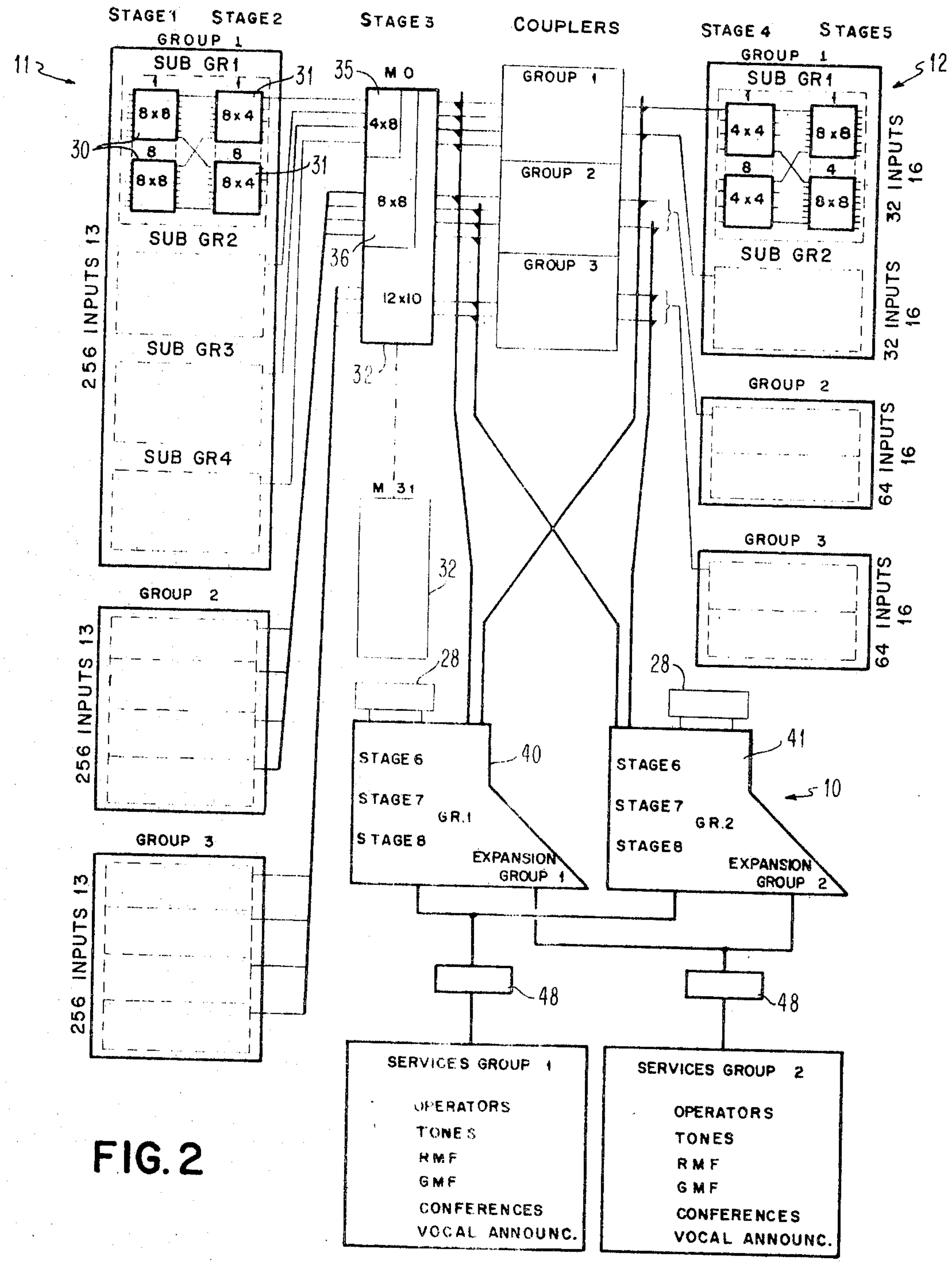
FIG. 2 is a schematic representation of the voice and the supervision circuits.

Referring now to FIGS. 2, 3, 4, and 5, the arrangement of the voice circuits will now be described in detail. In FIG. 2, it can be seen that the switching networks comprise eight matrix stages: three for the internal network, two for the external network, and three for the service network. The three stages of network 11 are numbered from 1 to 3, starting at the subscriber sets and ending at the couplers.

Stages 1 and 2 are each composed of three groups of matrices, each group being divided into four sub-groups having eight matrices for each stage. Each of the eight matrices 30 of each first stage sub-group comprise eight rows and eight columns of PNPN thyratron connectors and it can be seen that 256 telephone circuits 13 can be connected to the inputs of each group of matrices. Each of the eight matrices 31 of each second stage sub-group is made up in eight rows and four columns. The eight column leads of each first stage matrix 30 are connected to the leads of the same numbered row of each of the second stage matrices 31 belonging to the same sub-group. As will become evident during the description of the third stage, it will be possible to use, according to the routing requirements, either the first group on its own, the two first groups together, or the three groups together.

Figure 4:
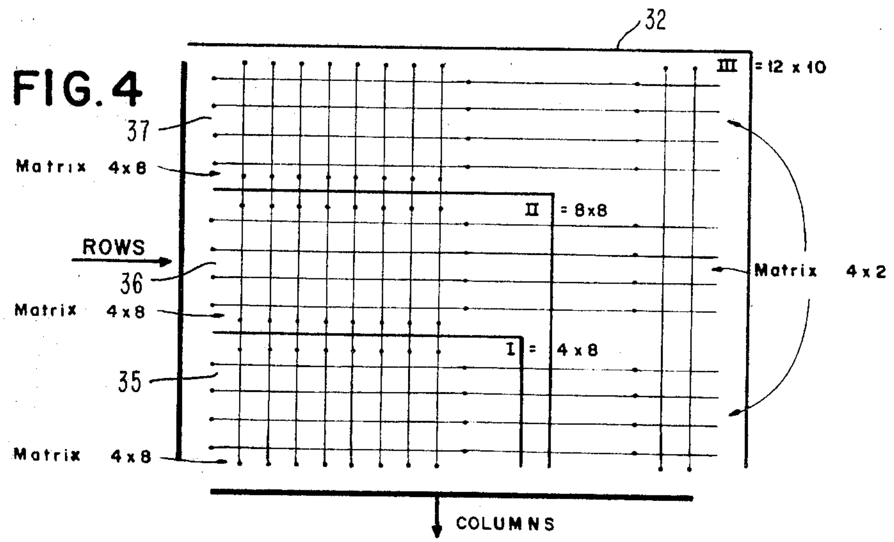
FIG. 4 is a schematic layout of a third stage matrix in the internal switching network.

Stage three comprises thirty-two matrices 32 whose modular configuration can be adapted to three configurations of the input groups of stages 1 and 2. FIG. 4 illustrates the configuration of each matrix and shows that each matrix comprises twelve rows and ten columns and can be used in the three following manners:

Configuration 1, corresponding to the use of stages 1 and 2 of the first group only, is a matrix of four rows and eight columns;

Configuration 2, corresponding to the use of stages 1 and 2 of the first two groups, is a matrix of eight rows and eight columns; and Configuration 3, corresponding to the use of stages 1 and 2 of all three groups, is the full matrix of twelve rows and ten columns.

Connections between second stage matrices 31 of the groups and the matrices 32 of the third stage are effected as follows:

The thirty-two column leads of the second stage matrices 31 belonging to a given sub-group, are connected to the same numbered row leads of the thirty-two third stage matrices 32.

Each of the thirty-two first group output column leads from matrices 31 is connected to a row lead of the 4 x 8 matrix configuration 35 in a different one of the thirty-two matrices 32 in stage 3. Each one of the four row conductors of a given 4 x 8 matrix part 35 of matrix 32 is connected to one column lead coming out of a different sub-group of a stage.

Similarly each of the 128 second group output column leads is connected to one of the four row leads forming the second 4 x 8 matrix part 36 of a matrix 32 in each of the thirty-two matrices 32 of stage three. To each one of these four row conductors, of a given second 4 x 8 matrix 36, corresponds one column lead coming out of a different sub-group in group 2.

Also each of the third group output column leads is connected to one of the four row leads forming the third 4 x 8 matrix 37 part of matrix 32, this being applicable to all of the thirty-two matrices 32 of stage 3. To each of these four row conductors, for a given 4 x 8 matrix part 37, corresponds a column lead coming out of a different sub-group in group 3.

The two stages of output network 12 are numbered 4 and 5, starting at the couplers 19 and ending at the external lines 16. These stages comprise three main groups of matrices with each group subdivided into two sub-groups, each sub-group in stage four comprising eight 4 x 4 matrices, and a sub-group in stage five comprising four 8 x 8 matrices. Thus it can be seen that each group of output network 12 can be connected to sixty-four external lines 16. The four column leads of a fourth stage matrix are each connected to one of the row leads of a fifth stage matrix belonging to a same sub-group. According to traffic requirements, it is possible to use either the first group only, the two first groups together, or the three groups together for 64, 128, or 192 external lines and this independently of the number of inputs chosen for internal network 11.

Figure 3:
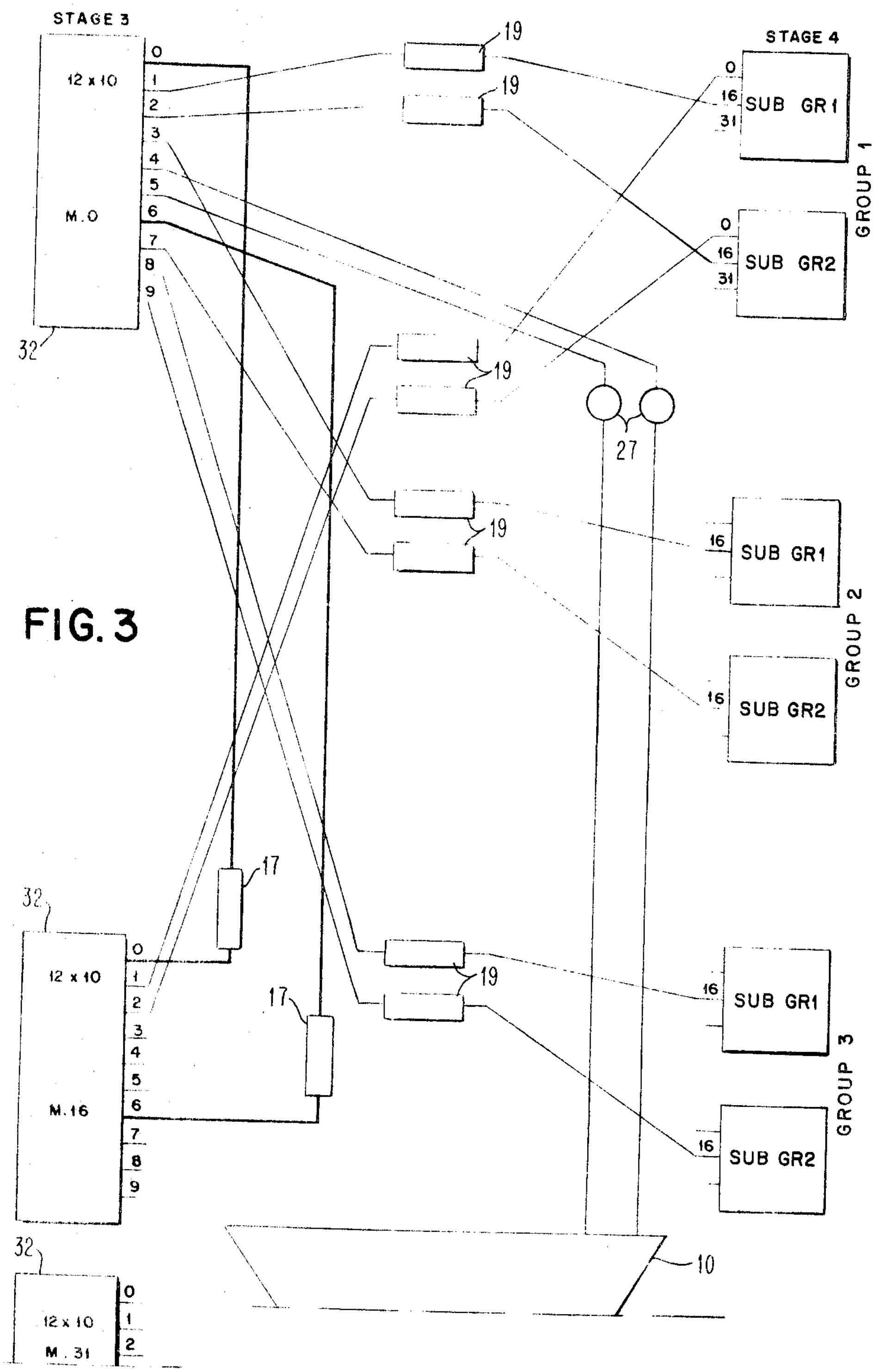
FIG. 3 indicates the distribution of various couplers and feeders within the switching network.

Referring now to FIG. 3, an example of connections between the couplers 19 and the three networks 10, 11, and 12, will now be described in detail. This description refers to a case where all the column leads of the third stage matrices 32—(ten leads per matrix), and the three groups of stages 4 and 5, are used. The ten column leads of each of the thirty-two third stage matrices 32 (numbered 0 to 31) are allocated numbers 0 to 9. Each of the three groups in stage four are subdivided into two sub-groups (sub-groups 1 and 2). Each of these sub-groups comprises thirty-two row leads shared amongst eight matrices, and these row leads are numbered 0 to 31.

Column leads 0 and 6 of a matrix *n*, in stage 3, are respectively connected by means of internal couplers 17 to similarly numbered column leads of matrix $n+16$ (modulo 32) of stage three. In FIG. 3, column leads 0 and 6 of matrix 0 are respectively connected to column leads 0 and 6 of matrix 16.

Column leads 4 and 5 of each of the thirty-two matrices 32 in stage 3, are connected to service network 10, via intermediate couplers 27.

The six remaining column leads of the thirty-two matrices in stage 3, that is to say leads numbered 1, 2, 3, 7, 8, and 9, are connected via external couplers 19, to the row leads of the fourth stage matrices in external network 12, these connections being effected in the following order:

Specially,

Column leads 1, coming out of each of the thirty-two matrices 32 in stages 3, are respectively connected to the thirty-two line leads of sub-group 1 in group 1 of stage 4. Column leads 2 coming out of the same matrices 32 are respectively connected to the thirty-two row leads of sub-group 2, in group 1 of stage 4 and so on.

The thirty-two column leads 3, of the third stage matrices 32, are connected to the thirty-two row leads of sub-group 1, in group 2 of stage 4 and so forth to:

Column leads 9 coming out of the third stage thirty-two matrices 32 are respectively connected to the thirty-two row leads of sub-group 2, in group 3 of stage 4.

More generally

Column leads 1, 2, 3, 7, 8, and 9 coming out of a matrix *n* in the third stage, are respectively connected to leads number $n+16$ (modulo 32) in the six sub-groups of stage 4.

According to traffic requirements, two or more external couplers 19 can be replaced by one, or more, internal couplers 17, as for example, when communications between internal subscribers 13 are more frequent than communications between an internal subscriber 13 and an external line 16. To achieve this, consider on one hand, a column lead *p* leading to a coupler 19, and coming out of a third stage matrix *n* and, on the other hand, a column lead *p*, coming out of third stage matrix $n+16$. These two leads may be connected by means of an internal coupler 17 and the two external couplers 19 thus freed are removed from the system. Since couplers 19 and 17 have perfectly similar functions to perform, their electrical configuration is the same and they can be interchanged.

On the other hand, there is a great flexibility in the number of couplers used due to the fact that stage three matrices 32 can be used in different manners, that is to say with configurations of 4 x 8, 8 x 8, or 12 x 10 matrices as illustrated in FIG. 4.

As an example, the column leads of a third stage matrix, used with only the first group of matrices of network 11, could be connected to one internal coupler 17, two external couplers 19, and one intermediate coupler 27.

Figure 5:
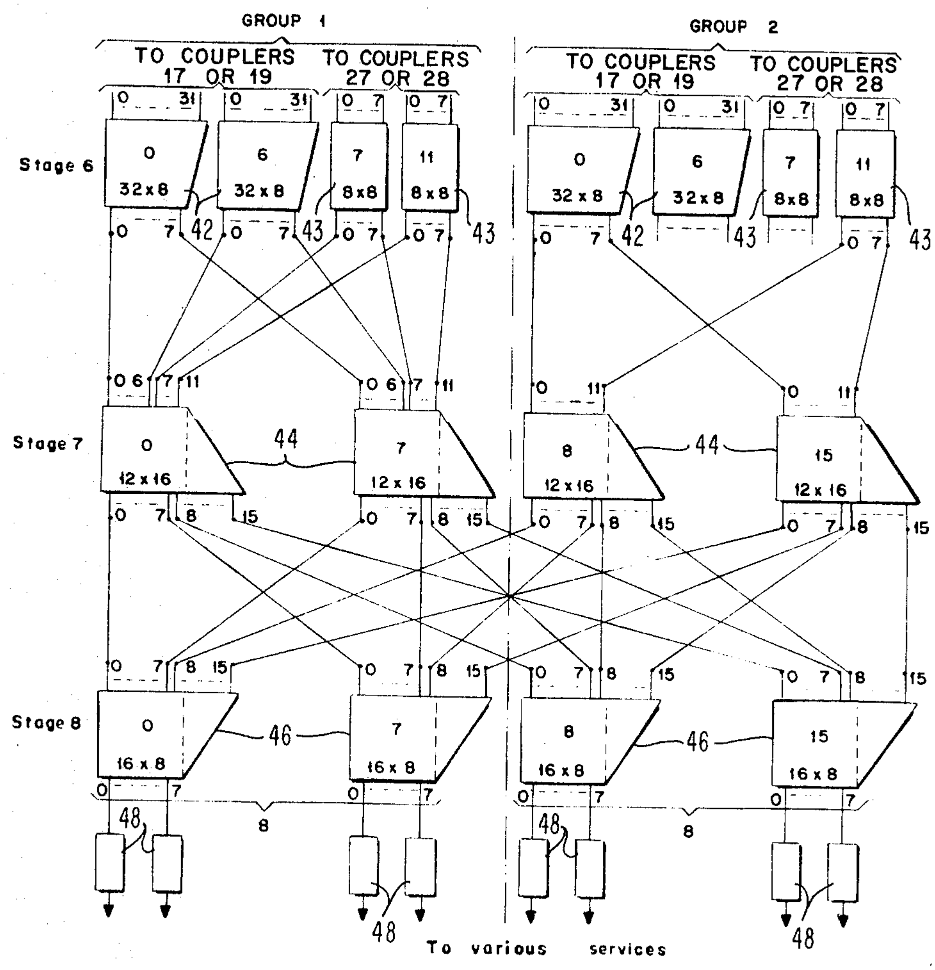
FIG. 5 is a diagram of the service network.

Referring now to FIGS. 2 and 5, the layout of service network 10 will now be detailed. This network comprises three matrix stages, numbered 6 to 8, starting from the main switching network and ending at the various services. It is divided into two groups, a first group 40 and a second group 41. Stage 6, for each group, FIG. 5 is composed of seven 32 x 8 matrices 42 having thirty-two row leads and eight column leads and of five matrices 43 having eight row and eight column leads. These matrices are respectively numbered from 0 to 11, in each group. Stage 7, for each group, is composed of eight 12 x 16 matrices 44 having twelve row leads and sixteen column leads. In order to allow for expansion, as will be explained later, either the sixteen column leads, or only eight per matrix, can be used. These matrices 44 are numbered from 0 to 7 in the first group, and 8 to 15 in the second. Stage 8 comprises, for each group, eight 16 x 8 matrices, 46 of sixteen row leads and eight column leads. For the reason just mentioned, either the sixteen row leads or only eight per matrix, can be used. These matrices are numbered from 0 to 7 in the first group, and from 8 to 15 in the second.

Connections of the various stages of network 10 are effected as follows:

For a matrix having a number *p* of row leads and a number *q* of column leads, the former are numbered from 0 to $(p-1)$ and the latter are numbered 0 to $(q-1)$. Thus, for all the matrices 44 of stage 7, the row leads are numbered from 0 to 11 and the column leads from 0 to 15.

Connections between stages 6 and 7.

For the first group, a column lead numbered *r* and belonging to the matrix 42 or 43 numbered *n* in stage 6, is connected to the row lead numbered *n* in the matrix 44 numbered *r* in stage 7.

For group 2, a column lead numbered *r* and belonging to the matrix 42 or 43 numbered *n* in stage 6, is connected to the row lead numbered *n* in the stage of matrix 44 numbered $r+8$.

Connections between stages 7 and 8.

A column lead *t*, belonging to a matrix 44 numbered *p* in the seventh stage, is connected to row lead *p* belonging to matrix 46 numbered *t* in the eighth stage.

Thus it can be seen that all the column leads 0 to 7 coming out of the sixteen matrices 44 of stage 7 are respectively connected to all the row leads entering the first eight matrices 46 of stage 8 (these matrices being numbered from 0 to 7).

Similarly, all the column leads 8 to 15, coming out of the sixteen matrices 44 of stage 7, are respectively connected to all the row leads entering the last eight matrices 46 of stage 8 (these matrices being numbered from 8 to 15).

This modular configuration of the connections effected between the various matrix stages of network 10, and particularly between those of stages 7 and 8, confers to the said network a great utilization flexibility. It is possible, in particular, to use only one group of matrices 42, 43, and 44 for stages 6 and 7, and all the matrices 46 of the eighth stage or, inversely, all the matrices 42, 43, and 44 in stages 6 and 7 and only one group of matrices 46 in stage 8, according to the PBX requirements. Such flexibility in the utilization of network 10 is illustrated in FIG. 2, where the two matrix groups are represented together with their respective expansion matrices.

As already mentioned above, each group of matrices in stage 6 of network 10 comprises seven matrices 42 having thirty-two row leads and five matrices 43 having eight row leads.

The first seven matrices 42 are reserved for connections with the internal and external couplers 17 and 19 (it is to be recalled that each side of each of the couplers 17 and 19 is connected to one input of network 10). According to the configuration chosen for the matrices 32 of stage 3 on one hand, and according to the allocation of internal and external couplers on the outputs of these matrices 32 on the other hand, the rules regarding connections with the row leads of the sixth stage matrices 42 and 43 can vary. If through use of groups 2 and/or 3 of network 11 associated with the matrices 32 in stage 3, the number of connections leaving the couplers is higher than the number of row leads provided by the seven matrices 42 of group 1 in stage 6, it is necessary to use the second group of matrices 42 in that same stage.

The last five matrices 43 of stage 6 are reserved for connections with the intermediate couplers 27 and with the inter-service couplers 28. The purpose of the intermediate couplers 27 is to insure the presence of a maintenance current within network 11, during connection of an internal subscriber and one of the services. In the event that the configuration adopted for the matrices 32 of stage 3 leads to the use of only one coupler 27 per matrix 32, making a total of thirty-two couplers 27, the latter are respectively connected to thirty-two leads, corresponding to four matrices 32 of that stage. The fifth matrix 43 is then used for connections with the inter-service links.

In the case where a larger configuration is adopted, it will be necessary to make use of the second group of matrices 42 and 43 of stage 6.

As already mentioned, each matrix 46 in stage 8 of network 10 comprises eight column leads. These conductors are respectively connected to various services by means of service couplers 48. According to the need of the particular service with which they are associated, these couplers 48 can act either as simple feeders, or as feeder-connectors. Generally the former are used with service circuits carrying unidirectional signals, such as tone generators, while the latter are used with circuits carrying bi-directional signals such as operators' sets 21 and conference circuits 25.

Figure 6:
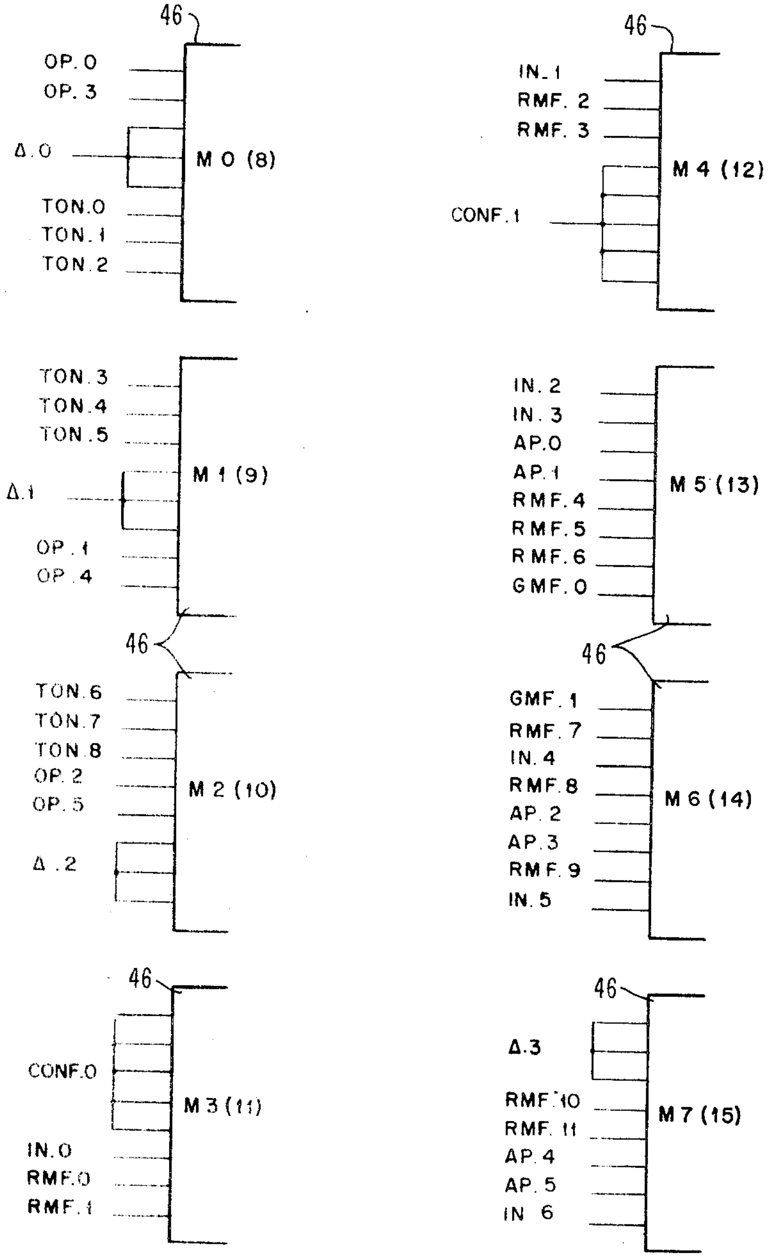
FIG. 6 is a block diagram representing the distribution of various services at the inputs of the service network.

A typical grouping of various services with the matrices 46 is illustrated in FIG. 6. On this figure a single group of matrices 46 in stage 8 is schematically indicated, the outputs of the second group of matrices 46 (numbers in parenthesis) being indicated as presenting a similar service grouping.

In this figure, the various elements have been identified as follows:

0 to 15—the sixteen matrices 46 in stage 8 of network 10.

Conf. 0, Conf. 1—two conference circuits 25 connectable to five subscribers each.

0 to 3—four conference circuits 25 for three subscribers each.

Ton. 0 to Ton. 8—nine tone transmitters 21,

RMF 0 to RMF 11—twelve multi-frequency receivers 22,

GMF 0 to GMF 1—two multi-frequency generators 22,

AP 0 to AP 5—six vocal announcement sets 24.

IN 0 to IN 6—seven non-used service lines,

Couplers 48 and the service units have not been shown, in order to simplify the drawings.

The operator circuits 20 consist of telephone sets and carry only voiced signals.

A distinction has been made between conference circuits 25 for three and five subscribers because their electrical configuration differs, the former necessitating only the coupling in parallel of the subscribers lines, while the five way conference necessitates the use of amplifying means to compensate for the attenuation caused by the higher number of connected lines.

The tone transmitting circuits 21 are used to send the dial tone, the busy tone and the ring back signals, as well as any other desired tone signals. These circuits are all identical and conventionally are fed with a common AC supply of 400 cycles. The 400 cycle signal is interrupted in each circuit at a rate determined by the instructions from a central processing unit 50, so that each of these circuits can deliver any of the above-mentioned tone signals.

The multi-frequency receivers 22, are used to detect the selection signals sent by the multi-frequency keyboard type telephone sets. The receivers 22 receive signals formed by a combination of one frequency out of four, and one frequency out of three, and convert the signals into logic signals to be used by the central processing unit 50. They also provide the dial tone for the multi-frequency selection telephone sets.

The multi-frequency generators 22 are used for testing multi-frequency receivers through the inter-service couplers 28. The generators 22 can also send multi-frequency signals for control purposes on external lines with multi-frequency selection. They are operable in a manner similar to that of multi-frequency selection sets, since they include two variable-frequency oscillators. According to instructions issued by the central processing unit 50, they can generate and combine two selected frequencies and send the signal to an associated coupler 48.

The vocal announcement sets 24 are used to pass a recording to a calling subscriber in certain cases, as for example to help him wait patiently, when his call cannot be immediately put through.

Figure 7:
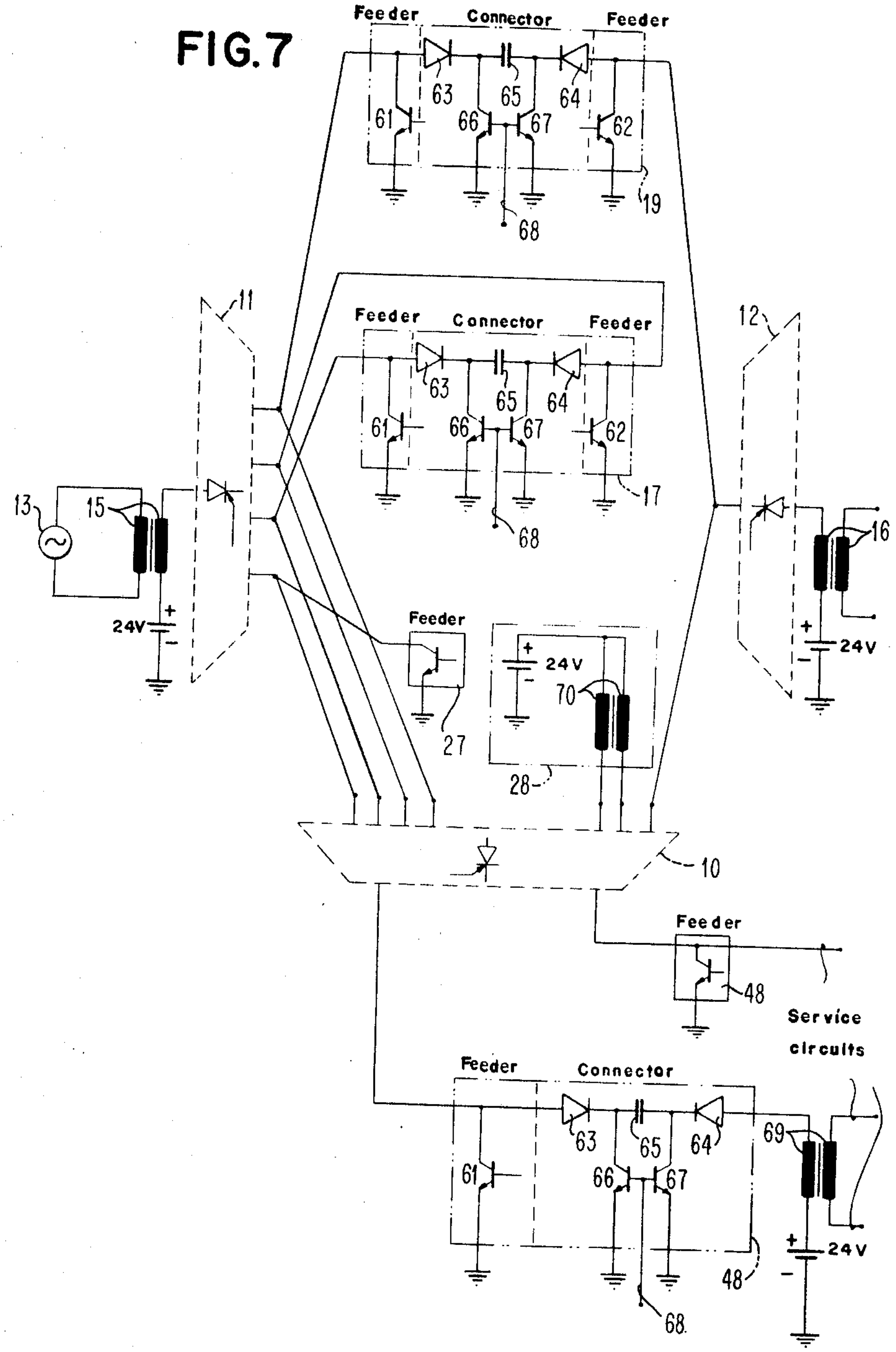
FIG. 7 shows the electrical layout of typical ones of the voice circuits.

Referring now to FIG. 7, the voice circuits layout will be schematically described.

As already seen above, the three switching networks 10, 11, and 12 are made up of matrices having electronic cross-point connections, e.g. controlled PNPN thyratrons.

For the thyratrons 16 to fire, a predetermined voltage called "maintenance voltage" is applied to their terminals, and it is then necessary to apply a pulse on their control electrode. This pulse is controlled by the central processing unit 50, and is sent over the marking circuits 51. The maintenance voltage is provided by a 24 volt DC supply.

Subscriber lines 13 are respectively connected to network 11 via transformers 15 whose secondary windings network 12 side) have one terminal connected to the 24 volt DC supply, and the other connected respectively to the row leads of the first stage matrices 30. The main object of these transformers is to provide direct current isolation in the subscriber lines of the switching network. Similarly, the external lines are respectively connected to network 12 via transformers 16 whose secondary windings (network 12 side) have one terminal connected to the 24 volt DC supply, and the other connected to the column leads of the fifth stage matrices.

Internal and external couplers 17 and 19 consist of three parts: two feeders and one connector.

The feeders essentially comprise one transistor 61, or 62, which, when conducting, grounds the electrical circuit comprising the 24 volt DC supply and the fired PNPN thyratrons which determine an established path through the network 10, 11, or 12.

The connector essentially comprises two diodes, 63 and 64, one capacitor 65, and two transistors 66 and 67 the bases of which are both connected to a control lead 68 while their emitters are grounded. Diodes 63 and 64 stop the passage of audio frequencies as long as they are not prepolarized, that is to say as long as transistors 61 and 62 do not conduct. The purpose of capacitor 65 is to stop the passage of direct current.

The operation of couplers 17 and 19 is identical and it will be better understood from the given example of an internal subscriber 13 calling for an external line.

A path is established in network 11 by setting transistor 61 conductive and by marking (triggering) the appropriate PNPN matrix thyratron. A direct current electrical circuit is thus obtained (24 volt DC supply, matrix cross points, and transistor 61). The same is done for transistor 62 (establishment of a path within network 12). Both of these direct current circuits are independent from one another because of the presence of capacitor 65. Furthermore, the audio frequencies cannot pass from one circuit into the other because diodes 63 and 64 are not polarized in the forward direction. When it is desired to establish a communication between the two circuits, transistors 66 and 67 are rendered conductive with a signal on control 68. The direct currents then polarize diodes 63 and 64 and the AC current can flow between the two circuits, the direct currents remaining always independent from one another.

The only function of intermediate couplers 27 is to act as feeders. Indeed, their only purpose is to connect the internal subscribers 13 to the service network 10 and are used so as to avoid blocking of the internal couplers 17. When it is desired to establish a path between an internal subscriber and any given service, it is not possible to use directly the 24 volt supply and a service coupler 48, because this would lead to the simultaneous triggering of 6 matrix cross-points which is unacceptable, since the voltage drop would be too great for reliable PNPN firing. To remedy this the network 11 thyratrons are fired by using an intermediate coupler 27 and, when this is done, the thyratrons of service network 10 are fired by using a coupler 48. Coupler 27 is then deenergized, the PNPN maintenance voltage being presented through the 24 volt supply and coupler 48. It must be noted that to establish a path between an external line and any given service, the same principle applies with the exception that transistor 62 of a coupler 19 is used instead of an intermediate coupler 27.

It has been said that, according to their function, service couplers 48 can be of two different types. For service circuits carrying unidirectional signals, such as the tone transmitters, couplers 48 are only used as feeders. For service circuits using bidirectional signals, such as the operators' sets and the conference circuits, couplers 48 are used as both feeders and connectors. In this last case, the connector output is connected to one terminal of a first winding of a transformer 69 while the other transformer winding is connected to the appropriate service.

As already seen, the feeder role of the service couplers permits cross-point firing in the matrices of network 10.

The connector role, as well as the operation principle, of couplers 48 are identical to that of couplers 17 and 19.

Inter-service links 28 essentially comprise a transformer 70 whose winding terminals are respectively connected to the 24 volt DC supply and to service network 10. The current supply is used to feed the thyratron cross-points of an established matrix path when the transistor of the corresponding coupler 48 is conductive. The transformer 70 is used to couple the audio signals from the two services connected by link 28.

OPERATOR CONSOLE DESCRIPTION

The operator consoles 72 (FIG. 1) provide, to a number of operators, the means for controlling and supervising certain of the PBX functions. The exact number of consoles 71 can vary and depends upon traffic requirements. They each consist of control desks which do not receive physically the audio signals. The latter pass through the circuits of telephone sets placed upon the control desks, with which they have no electrical contacts. In fact, the electrical circuits of these desks are directly connected only to the central processing unit.

The desks essentially comprise indicator lights and touch-keys, each having functional significance.

The indicator lights correspond to three categories of functions which are:

To inform the operator of calls reaching the desk (e.g., call from an external line or from an internal subscriber).

To keep a visual record of everything the operator is in the process of doing, and of the states of calls which have not been completely processed (e.g., call on standby).

To inform the operator of certain particular events (called number busy, no external lines available, etc. . . .).

By means of the keys, the operator can carry out the following functions:

Connect to an internal extension or an external line, which has called the operator.

Enter the number of an internal or an external subscriber.

Connect to an external line for connection with the public network.

Put and keep on standby a call arriving at the desk.

Fulfill auxiliary functions such as: offer a busy number, transferring one call to another operator, etc.

Furthermore, the desks can comprise a visual display device giving certain data in clear.

The calls are simultaneously indicated on all operator consoles 72, by means of indicator lights, there being only one indicator light per type of call (local call, external call, hired line call, etc.). The same applies for the other types of functions, for which only one indicator light is provided, on each console, for a given function.

The operators can take advantage of a certain number of working facilities of the central processor 50, the principles of which are given below:

Offer:

If a network call presents a certain character of urgency, the operator can break in on a conversation, when she finds the called subscriber busy, and inform him of the call.

Putting on Standby:

If the called subscriber is busy, the operator can put an incoming call on standby. As soon as the subscriber is free, communication is automatically established.

Holding up a call:

If the operator is in the process of establishing a communication when a new call arrives, she can hold up the first call while she answers the second. When the communication associated with this last call is established, she can proceed with the held up call.

Transfers to other operator positions:

An incoming call can be transferred to another operator.

Operator recall:

In order that an external call put on standby, or held up, by the operator is not overlooked after a certain delay, it is again sent to her console so as to attract her attention. Furthermore, during the standby, or the hold up period, the caller receives a recorded voice announcement to help him wait patiently.

Consecutive calls:

If the calling subscriber wishes to speak successively to several internal subscribers, the operator can establish a communication with automatic recall.

When the conversation in progress has ended, the operator is recalled and can then call the next internal subscriber.

Night service:

When the operators have terminated their daytime tour of duty, the incoming calls are automatically switched towards a certain number of subscriber sets, chosen in advance and from which the calls can be answered and also transferred.

The night service can also be centralized, all the incoming calls being systematically switched to a single extension (for example, the night watchman or house keeper extension), or indicated inside the whole building, where they can be answered from any extension, by dialing a one number code.

CONTROL CIRCUITS DESCRIPTION

The control circuits are divided into two large categories: the scanning circuits 75, and the marking circuits 51. These circuits work in close cooperation with the central processing unit 50 (CPU).

The scanning circuits 75 form the principal input units of the data the central processing unit 50 uses for controlling the switching networks 10, 11, and 12. These circuits 75 pick up data provided by the various voice circuits, and transmit them to the central unit 50. As can be seen in FIG. 1, the scanning circuits essentially carry out the following functions:

Subscriber loop scanning 76, carried out cyclically and which permits detection of the different states taken by the extension (busy, free), the unhooking of a calling, or called subscriber set, the calling number dialled by the subscriber, replacing of the set by the calling, or the called subscriber, etc.

External line circuit scanning 77, carried out cyclically and which permits detection of the various external line states, and of the supervision signals sent on that line by the public network (external incoming calls, external line state, charge pulses, etc.).

Scanning of the various couplers 17, 19, 27, and 28 by units 91, 92, 93, and 94 respectively to verify that their feeding and, eventually, their connection, have indeed been carried out.

Operator console scanning. When an operator depresses a key, scanner 78 detects the status change of the corresponding line and transmits to CPU 50 on one hand, the operator number, and on the other hand, the action she will take. Similarly, when the operator composes a number on her keyboard, scanner 78 transmits it to central unit 50.

Services scanning. Scanner 79 is used to detect the state of various services and, principally, the state changes corresponding to the decoding of subscriber numbers coming out of the multi-frequency receiver 22.

The marking circuits 51 are used to establish connections and disconnections on the voice and the supervision circuits. They essentially comprise:

The controlling of various couplers (81, 82, 83, and 84) which operate to control the feeder function for a path to be established and furthermore, for certain of these couplers, to control the connector function between two voice circuits.

The triggering of various switching network cross-points by unit 86 for the network 11, by unit 87 for network 12 and by unit 88 for the network 10. The object is to make conductive the cross-points corresponding to a path that is to be established within a network, under control of CPU 50.

The control of various services. Unit 89's function is to transmit the orders issued from CPU 50 to the said services and, principally, to control the tone rate for tone transmitters 21.

The setting of operator consoles. Unit 90 functions to light, or extinguish the indicator lights (or evenutally to make them wink) and to control the visual display device.

The central processing unit (CPU) 50 receives, from the scanning circuits 75, the data picked up from the various voice circuits, processes the data according to a predetermined program and orders the marking circuits 81 through 94 to effect the various connections, or disconnections, which have to be realized.

The CPU 50 may be a conventional type of commercial electronic data processing machine. In general, the requirements are for sufficient operating speed to maintain satisfactory service for the maximum expected system traffic and sufficient fast data storage capacity to maintain a complete record of the system status from one system scan to another. One commercial processing machine which has been found to be satisfactory for this service is the Model 1130 System produced by International Business Machines Corp.

This CPU 50 essentially comprises:

Storages which can be of two types: semi-permanent storages for the recorded program, and temporary storages used to record the scanning results and the various control orders being carried out, especially voice circuits markings.

A logic unit, which processes data provided by the scanning circuits in accordance with the instruction of the recorded program and directs performance of the resulting conclusions (marking, etc.).

The operating program which is recorded in the semi-permanent memories of the central unit UCT. This program directs performance of the following essential functions:

Detection of status changes on the internal extension lines 13, the external lines 16 and on the circuits corresponding to the operator console keys 20.

Reconstitution from observations regarding internal extension line status changes of the the numbers of requested extensions and recording them.

Interpretation of all information received from the internal extension lines 13, the external lines 16 and the operator consoles 20, deduction from these interpretations of the corresponding decisions to be taken (establish a path within the network, send a tone signal, light-up indicator lights on operator consoles, transmit numbers on external lines, etc.) and finally, verify that these decisions have correctly been carried out.

Detection of operational errors, their correction, and localization of faulty circuits.

The operating program is divided into a number of sub-programs, each of which has a clearly defined function. Certain of these sub-programs, such as those concerned with scanning, reconstructing numbers, tone rhythm, number transmissions on external lines, etc. must be carried out at defined time intervals. For this reason they are called synchronous sub-programs. Others, for example, those used for establishing connections, are to be carried out at any time within a limited time period and can be performed during periods left free by the synchronous sub-programs. These are called asynchronous sub-programs.

To have a better understanding of the invention, certain telephone communications taking place within a PBX will be described.

Communication between two internal subscribers, through dialling (number sent by current interruption in the subscriber loop):

When a subscriber A has lifted his set off the hook, a current flows in his loop circuit and is detected by scanning circuit 76 which cycles every 20 milliseconds. The address of calling line A is stored. Then, the central processing unit 50 looks for a tone source 21 which, through a coupler 48 and a coupler 27 has access to A and also looks within itself for a dialling recorder which is available. Connection orders are sent to the switching network, couplers 48 and 27 and the tone source 21, in order to connect subscriber A to the latter. Subscriber A then receives the "ready to dial" tone.

The numerals of the desired extension sent by subscriber A are detected by scanner 76 which transmits to CPU 50, the interruptions caused in the subscriber loops by the dialling device. These numerals are then stored in CPU 50. The interruption information is received by a numeral recognition device which reconstructs the numerals dialled by subscriber A and enters them in coded form in the dialling recorder which has previously been found to be free. The CPU 50 logic unit analyzes the first numeral, to see if it is a code reserved for calling a special service (e.g. request for an operator, special lines, etc.) or the numeral of the hundredth rank corresponding to a subscriber's extension (assuming that the internal extensions have a three numeral call number). In both cases, the "ready to dial" tone is interrupted after the first numeral, and resulting orders are sent, via the marking circuits 51, to the tone source and couplers 48 and 27 which were connected to subscriber A. The subscriber A is then no longer connected to the switching network.

The numerals dialled by subscriber A are then counted and recorded. When the third numeral has been recorded, the CPU logic unit checks the state of called subscriber B. The subscriber states, as well as that of all the switching network elements (couplers, connection loops, etc.) are stored in tables which are updated under control of the program, each time a status change takes place.

If called subscriber B is engaged, the logic unit seeks again a tone source 21 which, through couplers 48 and 27, has access to A. Marking circuit 89 controls the cadence at which the tone is transmitted, and subscriber A can hear the busy signal.

If subscriber B is free, the central unit 50 seeks a free path between subscribers A and B, by consulting the stored tables which indicate the present network element states. This path will comprise a coupler 17. A new free path search is then carried out to connect the side of coupler 17 which is associated with the calling subscriber, to a tone source 21. The logic unit 50 then gives out the following orders:

Connect subscriber A to coupler 17 (marking circuits 86 and 83).

Connect calling side of coupler 17 to the corresponding tone source 21 (marking circuits 84 and 88). Subscriber B is not connected to a tone source 21 because the call ring is automatic.

Control the tone source 21 rhythm so that the calling subscriber receives the return ringing tone.

Connect subscriber B to coupler 17 (marking circuits 86 and 83).

When scanner 76 detects the lifting off of subscriber B's set, the central unit 50 sends the following orders:

Disconnect calling side of coupler 17 from tone source 21 (marking circuit 84).

Connect the caller and called sides of the coupler 17 (marking circuit 83).

Interruption of the ringing current, at subscriber B, is carried out automatically.

At the end of the calls, the on hook condition of subscribers A and B is detected by scanning circuit 76. The central unit 50 sends into the network the appropriate release orders over marking unit 81, that is to say: disconnect coupler 17. If one of the two subscribers does not hang up, he will be connected to a tone source 21 and receive the "busy" tone inviting him to hang up. If this off hook situation lasts for more than a determined time, the off-hook subscribers line is considered to be faulty, this faulty state being recorded in the subscriber state tables maintained by the CPU 50 and the busy tone is interrupted.

Communication between internal subscribers, using a multi-frequency telephone set.

Such a communication takes place in a manner identical to that of the previous case, excepted for the tones sent to calling subscriber A and for the determination of the number he wants.

When subscriber A takes up his set, the current flowing in his loop circuit is detected by scanning circuit 76. After storing the address of calling subscriber A, the central unit 50 seeks a free path between the latter and a multi-frequency receiver 22. When such a path is determined, the central unit 50 connects subscriber A to receiver 22, by ordering the marking circuits 89, 84, 81, and 86 to carry out the operations that have to be effected. Subscriber A then receives the dial tone.

The number transmitted from subscriber A's keyboard is a frequency combination and is transmitted to receiver 22 where it is decoded and passed in decoded form to the central unit 50 where it is stored.

The rest of the communication is the same as for a telephone communication between two internal extensions, using a dial but the tones sent to subscriber A are all transmitted by receiver 22.

Communication between a subscriber outside the PBX and an internal extension, both subscribers using a dial.

When a public network exchange sends a ringing current on an external line 16, the said current is detected by scanning circuit 77, the address of the calling external line is stored, and the central processing unit 50 warns all operators by switching on their "external call" indicator lights (one light per console) via marking circuits 90.

When any operator depresses a key of her console corresponding to the "external call" light, the key operation is detected by scanning circuit 78 which transmits to the central unit 50 the indication that the call on line 16 is being taken care of by an operator and notes the address of the operator, the said address being stored in the processor 50.

The central processing unit 50 then gives the following orders:

Extinguish the "external call" lights on all the operator consoles 72, with the exception of the console 72 where the call is handled.

Change the state of the console light of the operator handling the external call (make it wink for example).

Carry out a free path search between line 16 and the set 20 of the operator handling the call, and mark the established path by units 84, 88, 82, and 87.

When the operator circuit 20 is connected to the external line 16, the public exchange detects this fact and interrupts the ringing current. The calling subscriber asks the operator to put him in communication with internal subscriber B. The operator depresses an "internal extension" key and this status change is detected by scanning circuit 78 which transmits notice of the change to the central unit 50. The latter controls the lighting up of the "internal extension" indicator light corresponding to the operated key, thus informing the operator that her request is recorded, then it disconnects line 16 and operator circuit 20.

The operator now dials subscriber B's number. The dialed number is detected by scanning circuit 78 and transmitted to CPU 50. The logic unit 50 checks the state of called subscriber B, in its subscriber state table.

If subscriber B is busy, central unit 50 lights up an "extension busy" light on the operator's console 72, via marking circuits 90. Being warned by this light that subscriber B is busy, the operator depresses an "external line recovery" key to inform CPU 50 that she wants to communicate with the calling external line 16. This key operation is detected by scanning circuit 78 and the logic unit 50 carried out a new free path search, between line 16 and an operator set 20. When the operator is again in communication with the calling subscriber, she tells him that the called extension is busy.

In the case where the calling subscriber hangs up, this condition is detected by scanning circuit 77 and the central unit disconnects the path established between line 16 and operator set 20 and, if necessary, extinguishes the operator's console lights.

In the case where the caller wants to wait until subscriber B is free, the operator depresses an "input hold up" key, to warn the central unit 50 that line 16 is to be held up. This key operation is detected by scanning circuit 79, and the central unit 50 lights up an "input hold up" light on the operator's console, indicating to the operator that her request has been recorded, disconnects the path established between line 16 and set 20 and if desired, connects the caller to a vocal announcement service 24, by establishing a path between the two of them. After a certain period of time has elapsed, the central unit 50, acting through marking circuit 90, modifies the status of the "input hold up" lamp on the operator's console (makes it wink for example) to remind her of the operation in progress.

If subscriber B is free, scanning circuit 76 transmits this information to the central processing unit which, by means of marking circuit 90, lights up the "internal extension free" indicator light of console 72, and carries out a free path search between subscriber B and set 20. This path is established by marking circuits 86, 83, 88 and 84. Subscriber B is not connected to a tone source because, as already mentioned, the call ring is automatic. When subscriber B picks up the set, the operator tells him that he is to be put in communication with an external line, and she depresses an "end of operation" key, an action which is detected by scanning circuit 78. The central unit 50 disconnects the operator and subscriber B, carries out a free path search between the latter and line 16 (this path is established by marking circuits 86, 82, and 87) and if necessary, extinguishes all the lights of the operator's console 72. Communication between subscriber B and the external subscriber is thereby established.

It must be noted that, if the operator has to handle several calls, she need not wait for subscriber B to answer and can connect him directly to the external line 16. To this end, as soon as her "extension free" light comes on, she depresses the "end of operation" key: central unit 50 receives this information via scanning circuit 78 and, moreover, scanning circuit 78 detects that subscriber B has not yet taken his set up. The logic unit 50 controls the extinction of the operator console lights and, if need be, disconnects the operator and subscriber B, establishes a path between line 16 and a tone transmitter 21 and, by means of marking circuit 89 order the said tone emitter 21 to send the ring back.

When subscriber B takes up his set, this condition is detected by scanner circuit 76 and the central unit 50 sends out the following orders:

Disconnect external line 16 and tone transmitter 21

Carry out free path search between lines 13 and 16

Mark this path so that the two subscribers can communicate

Discrete offer made by an operator who wants to transmit a message to a subscriber.

If the operator wants to communicate with internal subscriber B, she depresses the "offer" key. This action is detected by scanning circuit 78 and the signal is transmitted to the central unit 50 which seeks a free dialling recorder. Then the operator dials subscriber B's number which is stored in CPU 50. The logic unit looks in its status storage for coupler 19 used by subscriber B, and connects the operator's circuits 20 to it, on subscriber B side. The operator warns the two subscribers that she is going to communicate with B. She depresses "discrete offer" key and CPU 50 controls immediately effect the disconnection of the two subscribers by acting on the coupler 19. The operator alone thus remains in communication with subscriber B, in a discrete manner. When her message has ended, the operator depresses the "end of operation" key and CPU 50 disconnects her from subscriber B, on one hand, and connects the latter to the external line 16, on the other hand, thus re-establishing the interrupted communication.

While the invention has been particularly shown and described with reference to a preferred embodiment thereof, it will be understood by those skilled in the art that various changes in form and details may be made therein without departing from the spirit and scope of the invention.

What is claimed is:

1. A private branch type of telephone exchange having connected thereto a plurality of internal extensions and a plurality of external extensions, each set of extensions being divided into one or more groups and such groups being further divided into sub-groups, said exchange comprising:

a first plurality of switching matrices for each sub-group, each extension being connected to one terminal of a matrix, a second plurality of matrices for each sub-groups, each of said first plurality of matrices being connected to each of said second plurality of matrices, a third plurality of matrices for said internal extensions, each output of said second plurality of matrices for a sub-group being connected to a different one of said third plurality of matrices, a plurality of coupler units between said third matrices and said second matrices of said external extensions, each coupler being settable to pass voice signals between a selected pair of lines of said matrices, a service group of interconnected switching matrices, a number of system service units, a record set of couplers settable to connect any of said service units through said service group of matrices to either side of said coupler units, and a central processing unit, said unit including means to scan the states of said internal extensions, said external extensions and said couplers, a data storage to retain a record of the last scanned state of said internal and said external extensions and said couplers, a comparison device to detect a change in the state of a scanned device, and a logic unit responsive to detection of a state change in a scanned device to make alternations in the conditions of selected ones of said matrices, said couplers, and said service units.

References Cited

UNITED STATES PATENTS

| | | |
|---|---|---|
| 3,204,038 | 8/1965 | Seemann. |
| 3,324,248 | 6/1967 | Seemann. |
| 3,400,220 | 9/1968 | Bowers. |
| 3,426,158 | 2/1969 | Browne. |

RALPH D. BLAKESLEE, Primary Examiner

U.S. Cl. X.R.

179—18